(12) United States Patent
Dagher et al.

(10) Patent No.: US 8,639,200 B2
(45) Date of Patent: *Jan. 28, 2014

(54) DEVICES AND METHOD FOR USING A DC-DC CONVERTER IN A MOBILE HANDSET (75) Inventors: Elias Dagher, Aliso Viejo, CA (US); Kevin Juan, Irvine, CA (US); Man H. Ku, Irvine, CA (US); Dmitriy Rozenblit, Irvine, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/230,070

(22) Filed: Sep. 12, 2011

(65) Prior Publication Data

US 2012/0064953 A1    Mar. 15, 2012

Related U.S. Application Data (63) Continuation of application No. 12/044,203, filed on Mar. 7, 2008, now Pat. No. 8,019,293.

(60) Provisional application No. 60/906,123, filed on Mar. 9, 2007.

(51) Int. Cl.
*H01Q 11/12* (2006.01)
*H04B 1/04* (2006.01)

(52) U.S. Cl.
USPC .......................... 455/127.1; 455/572

(58) Field of Classification Search
USPC ........ 455/571–572, 574, 127.1, 127.2, 127.5, 455/108
See application file for complete search history.

(56) References Cited

U.S. PATENT DOCUMENTS

| 6,133,712 | A | 10/2000 | Yeon | |
|---|---|---|---|---|
| 6,377,027 | B2 | 4/2002 | Takemoto | |
| 6,750,642 | B2 | 6/2004 | Murakata et al. | |
| 6,762,945 | B2 | 7/2004 | Morgen | |
| 7,457,592 | B2 | 11/2008 | Arayashiki | |
| 8,019,293 | B2 * | 9/2011 | Dagher et al. | 455/127.1 |
| 2002/0028700 | A1 | 3/2002 | Kato | |
| 2004/0229579 | A1 * | 11/2004 | Tsutsui et al. | 455/127.2 |
| 2006/0057980 | A1 * | 3/2006 | Haque et al. | 455/127.1 |
| 2006/0128445 | A1 | 6/2006 | Kimata | |
| 2007/0173282 | A1 * | 7/2007 | Noda et al. | 455/550.1 |

* cited by examiner

*Primary Examiner* — Nguyen Vo
(74) *Attorney, Agent, or Firm* — Knobbe Martens Olson & Bear LLP (57) ABSTRACT A controller enables the integration of a DC-DC converter in a mobile handset. The controller includes an input conditioner and an event sensor. The input conditioner uses a peak detector to track the output of a regulator and responds to available baseband input signals. The event sensor directs coupling between a voltage source and the DC-DC converter in response to a bypass event.

22 Claims, 5 Drawing Sheets

FIG. 5

DEVICES AND METHOD FOR USING A DC-DC CONVERTER IN A MOBILE HANDSET

CROSS-REFERENCE TO RELATED APPLICATIONS

This application is a continuation of U.S. patent application Ser. No. 12/044,203, filed Mar. 7, 2008, which claims priority to and the benefit of the filing date of U.S. Provisional Patent Application No. 60/906,123, filed Mar. 9, 2007, the benefits of the filing dates of which are hereby claimed and the specifications of which are incorporated herein by this reference.

BACKGROUND

This invention relates generally to transceiver architecture in a wireless portable communication device.

Radio frequency (RF) transmitters are found in many one-way and two-way communication devices, such as portable communication devices, (cellular telephones), personal digital assistants (PDAs) and other communication devices. An RF transmitter must transmit using whatever communication methodology is dictated by the particular communication system within which it is operating. For example, communication methodologies typically include amplitude modulation, frequency modulation, phase modulation, or a combination of these. In a typical global system for mobile communications (GSM) mobile communication system using narrowband time-division multiple access (TDMA), a Gaussian minimum shift keying (GMSK) modulation scheme is used to communicate data.

The deployment of new wireless systems presents unique challenges to mobile handset designers. In order to reap the full benefit of expanded capacity and increased data bandwidth, the new handsets must work on both the new systems as well as the old. One of these new systems has been named Enhanced Data Rates for GSM Evolution (EDGE). The EDGE standard is an extension of the Global System for Mobile Communications (GSM) standard.

The EDGE standard increases the data rate over that available with GSM by sending more bits per RF burst. More bits are sent in EDGE by using a modulation scheme based on 8-phase shift keying (8-PSK), which provides an increase over GSM's Gaussian minimum shift keying (GMSK) modulation format. In the EDGE modulation scheme, the 8-PSK constellation is rotated 3 radians every symbol period to avoid problems associated with zero crossings. In contrast to GMSK's constant amplitude envelope, the added rotation factor in the EDGE modulation scheme results in a non-constant amplitude envelope. The polar modulation scheme can be described in terms of amplitude modulation (AM) and phase modulation components. This non-constant AM presents some difficulties with regard to RF power control. These problems are exacerbated by the desire to have a single transmitter that can be used for both the GSM and EDGE standards. Conventional architectures use a bias controller that tracks the AM envelope to control a RF power amplifier. The PM component further controls the RF amplifier. The bias controller is essentially a low drop-out (LDO) regulator that drops the battery supply voltage by behaving like a resistor. Accordingly, conventional bias controllers increase the power budget of the mobile handset, which results in reduced talk times.

Previous solutions for dynamic power control in a mobile handset have focused on handsets that use the code division multiple access (CDMA) communication standard. CDMA systems use a complex modulation scheme that involves multiple users communicating on the same 1.25 MHz channel at the same time. An individual user is distinguished by a digital code while users with different codes appear as white noise. This noise level gradually increases as the number of users on a specific channel increases.

In CDMA systems, the variation in the number of users on a single channel in conjunction with the motion of a handset throughout a large cell area causes very large variations in the power levels available at the handset antenna. When the handset is at the edge of a cell site using a channel with many users, a very low noise figure is necessary to detect the required signal from the surrounding noise. On the other hand, when the handset is very close to the base station, a high input third-order intercept (IP3) point is essential to prevent distortion of the signal by non-linearities in the receiver. To meet these requirements, CDMA handsets need a receiver with a very wide dynamic range.

Previous solutions for dynamic power control in a CDMA handset track the envelope of the RF signal. That is, a DC-DC converter tracks the envelope of the RF signal. Although this approach maximizes power amplifier efficiency, it has some disadvantages. First, the DC-DC converter must be a high-bandwidth device to closely track changes in the RF envelope. A high-bandwidth DC-DC converter requires a relatively high-switching frequency to limit output ripple, which reduces the power efficiency of the DC-DC converter. In addition, a solution that tracks the RF signal requires precise alignment of the phases between the AM path and the PM path of the transmitter or a mechanism to counter any phase shift introduced by the DC-DC converter in the AM path.

Therefore, it would be desirable to provide dynamic power control in a mobile handset in an economic and efficient manner absent constraints on bandwidth, switching frequency, and alignment of amplitude and phase modulation paths in a transmitter.

SUMMARY

An embodiment of a controller for using a DC-DC converter in an amplitude modulation power control loop in a mobile handset includes an input conditioner and an event sensor. The input conditioner is coupled in series between a regulator and the DC-DC converter. The input conditioner includes a peak detector and a mode selector. The peak detector is responsive to the output of the voltage regulator. The mode selector is responsive to input signals from a baseband subsystem. The event sensor produces a signal that couples the DC-DC converter to a battery in response to a bypass event.

An embodiment of method for using a DC-DC converter in a mobile handset includes the steps of applying a DC-DC converter between a voltage source and a regulator in a power amplifier amplitude modulation control loop, the regulator having an output configured to control an input voltage to the power amplifier, commanding the DC-DC converter in a bypass mode when a transmitter is not enabled, enabling the DC-DC converter in response to a control signal that initiates a transmission burst, detecting a series of peak voltages from a regulator output, determining a target voltage in response to the series of peak voltages, commanding the DC-DC converter to transition to the target voltage and commanding the DC-DC converter to the bypass mode in response to a signal that indicates an end of the transmission burst.

The figures and detailed description that follow are not exhaustive. The disclosed embodiments are illustrated and described to enable one of ordinary skill to make and use the controller and method for using a DC-DC converter in a mobile handset. Other embodiments, features and advantages of the controller and method will be or will become apparent to those skilled in the art upon examination of the following figures and detailed description. All such additional embodiments, features and advantages are within the scope of the disclosed systems and methods as defined in the accompanying claims.

BRIEF DESCRIPTION OF THE FIGURES

The controller and method for using a DC-DC converter in a mobile handset can be better understood with reference to the following figures. The components within the figures are not necessarily to scale, emphasis instead being placed upon clearly illustrating the principles and operation of the controller and method. Moreover, in the figures, like reference numerals designate corresponding parts throughout the different views.

DETAILED DESCRIPTION

Although described with particular reference to a portable transceiver operating in the Global System for Mobile Communication (GSM) communication system, the controller and method for using a DC-DC converter in a mobile handset can be implemented in any communication device where dynamic power control of an amplitude modulated radio frequency signal is desired.

The controller and method for using a DC-DC converter in a mobile handset can be implemented in hardware, software, or a combination of hardware and software. When implemented in hardware, the controller and method for using a DC-DC converter in a mobile handset can be implemented using specialized hardware elements and logic. When the controller and method for using a DC-DC converter in a mobile handset is implemented partially in software, the software portion can be used to control components in the power amplifier control element so that various operating aspects can be software-controlled. The software can be stored in a memory and executed by a suitable instruction execution system (microprocessor). The hardware implementation of the controller and method for using a DC-DC converter in a mobile handset can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the controller and method for using a DC-DC converter in a mobile handset comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
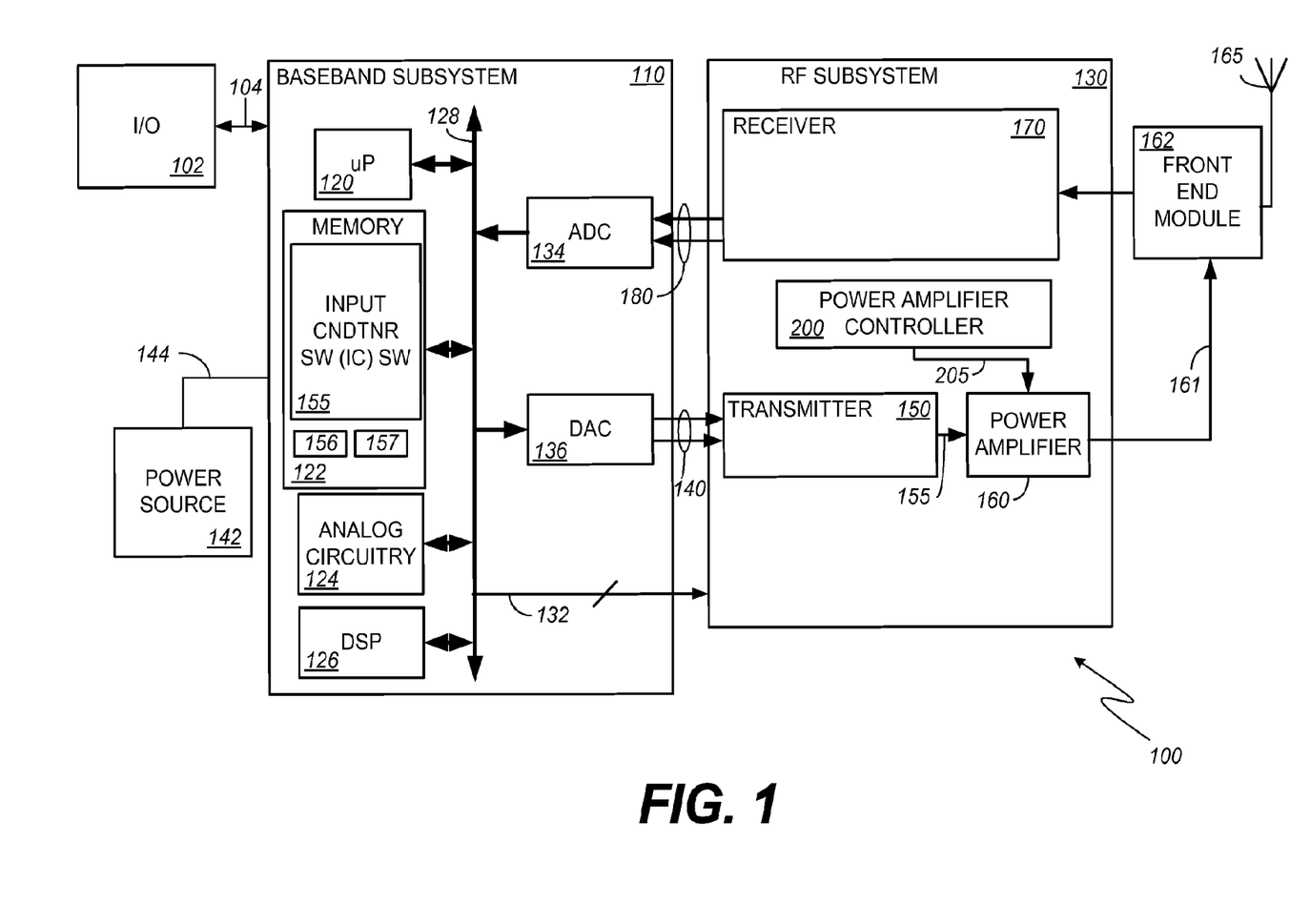
FIG. 1 is a block diagram illustrating a simplified portable transceiver including a power amplifier control element.

FIG. 1 is a block diagram illustrating a simplified portable transceiver 100 including an embodiment of a controller and method for using a DC-DC converter in a portable transceiver (e.g., a wireless handset). The portable transceiver 100 includes an input/output (I/O) element 102 coupled to a baseband subsystem 110 via connection 104. The I/O element 102 represents any interface with which a user may interact with the portable communication device 100. For example, the I/O element 102 may include a speaker, a display, a keyboard, a microphone, a trackball, a thumbwheel, or any other user-interface element. A power source 142, which may be a direct current (DC) battery or other power source, is also connected to the baseband subsystem 110 via connection 144 to provide power to the portable transceiver 100. In a particular embodiment, portable transceiver 100 can be, for example but not limited to, a portable telecommunication device such as a mobile cellular-type telephone.

The baseband subsystem 110 includes microprocessor (μP) 120, memory 122, analog circuitry 124, and digital signal processor (DSP) 126 in communication via bus 128. Bus 128, although shown as a single bus, may be implemented using multiple busses connected as necessary among the subsystems within baseband subsystem 110.

Depending on the manner in which the controller and method for using a DC-DC converter is implemented, the baseband subsystem 110 may also include one or more of an application specific integrated circuit (ASIC), a field programmable gate array (FPGA), or any other implementation-specific or general processor.

Microprocessor 120 and memory 122 provide the signal timing, processing and storage functions for portable transceiver 100. Analog circuitry 124 provides the analog processing functions for the signals within baseband subsystem 110. The baseband subsystem 110 provides control signals to a radio frequency (RF) subsystem 130. The RF subsystem 130 may include a transmitter 150, a receiver 170, power amplifier 160, and a power amplifier controller 200. The elements within the RF subsystem 130 can be controlled by signals from the baseband subsystem 110 via bus 132. Alternatively, the transmitter 150 and the receiver 170 may be located on an RF integrated circuit (IC).

The baseband subsystem 110 generates various control signals, such as a power control signal, that are used to control the power amplifier controller 200 and the power amplifier 160, as known to those skilled in the art. The control signals on connection 132 may originate from the DSP 126, the microprocessor 120, or from any other processor within the baseband subsystem 110, and are supplied to a variety of connections within the transmitter 150, receiver 170, power amplifier 160, and the power amplifier controller 200. It should be noted that, for simplicity, only the basic components of the portable transceiver 100 are illustrated herein. The control signals provided by the baseband subsystem 110 control the various components within the portable transceiver 100. Further, the functions within the transmitter 150 and the receiver 170 may be integrated into a transceiver.

The power amplifier controller 200 generates a power amplifier (PA) power control signal. The power control signal is coupled to the power amplifier 160 via connection 205. The power control signal controls the power output of the power amplifier 160 based on various inputs. For example, in an embodiment, a closed power control loop may influence the power output of the power amplifier 160. In another embodiment, an open power control loop may influence the power output of the power amplifier 160. For example, in an embodiment, a signal received by a base station with which the portable communication device 100 is communicating may issue a power control signal. In other embodiments, the baseband subsystem 110 provides enable and standby signals to the power amplifier controller 200.

If portions of the controller and method for using a DC-DC converter in a mobile handset are implemented in software that is executed by the microprocessor 120, the memory 122 will also include power or input conditioner (IC) software 155, a first register 156 and a second register 157. The first register 156 can be configured to contain a head room offset value for use in determining a target value, and the second register 157 can be configured to contain a value of a low-voltage limit, as will be described below. The IC software 155 comprises one or more executable code segments that can be stored in the memory 122 and executed in the microprocessor 120. Alternatively, the functionality of the IC software 155 can be coded into an ASIC (not shown) or can be executed by an FPGA (not shown), or another device. Because the memory 122 can be rewritable and because a FPGA is reprogrammable, updates to the power or IC software 155 can be remotely sent to and saved in the portable transceiver 100 when implemented using either of these methodologies.

Baseband subsystem 110 also includes analog-to-digital converter (ADC) 134 and a digital-to-analog converters (DAC) 136. In this example, the DAC 136 generates the in-phase (I) and quadrature-phase (Q) signals 140 that are applied to a modulator (not shown) in the transmitter 150. The ADC 134 and the DAC 136 also communicate with microprocessor 120, memory 122, analog circuitry 124 and DSP 126 via bus 128. The DAC 136 converts the digital communication information within baseband subsystem 110 into an analog signal for transmission by the transmitter 150. The connection 140, while shown as two directed arrows, includes the information that is to be transmitted by the transmitter 150 after conversion from the digital domain to the analog domain.

The transmitter 150 includes a modulator (not shown), which modulates the analog information on connection 140 and provides a modulated signal to an upconverter (not shown). The transmitter 150 transforms the modulated signal on to an appropriate transmit frequency and provides the upconverted signal to the power amplifier 160 via connection 155. The power amplifier 160 amplifies the signal to an appropriate power level for the system in which the portable transceiver 100 is designed to operate.

Details of the transmitter 150 have been omitted, as they will be understood by those skilled in the art. For example, the data on connection 140 is generally formatted by the baseband subsystem 110 into in-phase (I) and quadrature (Q) components. The I and Q components may take different forms and be formatted differently depending upon the communication standard being employed. For example, when the power amplifier 160 is used in a constant-amplitude, phase (or frequency) modulation application such as the global system for mobile communications (GSM), the phase modulated information is provided by a modulator within the transmitter 150. When the power amplifier 160 is used in an application requiring both phase and amplitude modulation such as, for example, extended data rates for GSM evolution, referred to as EDGE, the Cartesian in-phase (I) and quadrature (Q) components contain both amplitude and phase information.

The power amplifier 160 supplies the amplified signal via connection 161 to a front end module 162. The front end module 162 comprises an antenna system interface that may include, for example, a diplexer having a filter pair that allows simultaneous passage of both transmit signals and receive signals, as known to those having ordinary skill in the art. The transmit signal is supplied from the front end module 162 to the antenna 165.

The power amplifier controller 200 determines the appropriate power level at which the power amplifier 160 operates to amplify and modulate the transmit signal.

A signal received by an antenna 165 is directed from the front end module 162 to the receiver 170. The receiver 170 includes various components to downconvert, filter, demodulate and recover a data signal from a received signal, as known to those skilled in the art. If implemented using a direct conversion receiver (DCR), the receiver 170 converts the received signal from an RF level to a baseband level (DC), or a near-baseband level (.about.100 kHz). Alternatively, the received RF signal may be downconverted to an intermediate frequency (IF) signal, depending on the system architecture. The recovered transmitted information is supplied via connection 180 to the ADC 134. The ADC 134 converts these analog signals to a digital signal at baseband frequency and transfers the signal via bus 128 to DSP 126 for further processing.

Figure 2:
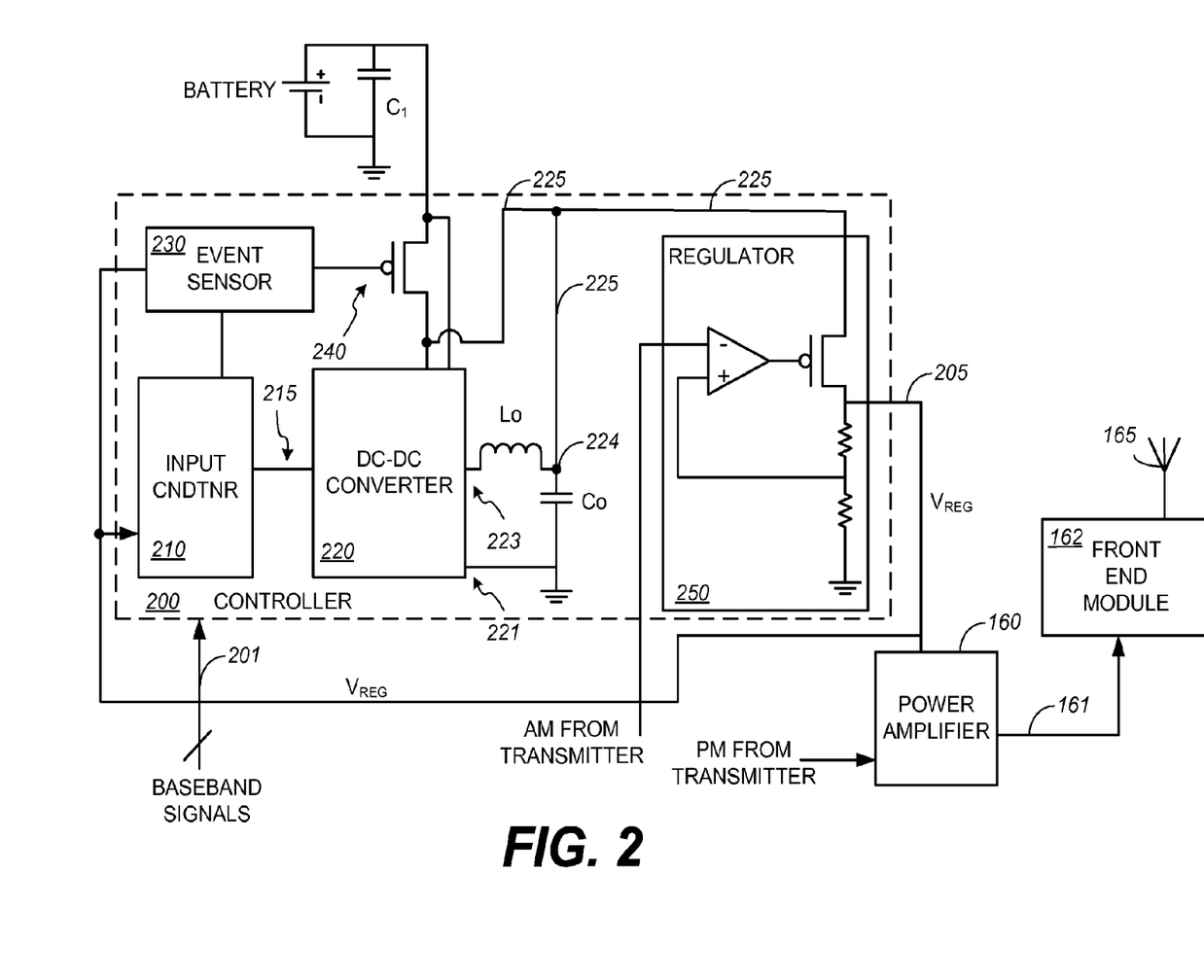
FIG. 2 is a schematic diagram illustrating an example embodiment of the controller and method for using a DC-DC converter.

FIG. 2 is a functional block diagram illustrating an embodiment of the power amplifier controller 200 of FIG. 1. The controller 200 includes an input conditioner 210, a DC-DC converter 220, an event sensor 230 and a regulator 250. The controller 200 receives power from the battery via a bypass switch 240. The bypass switch 240 operates in accordance with an input from the event sensor 230. Although the bypass switch 240 is represented in FIG. 2 as a field-effect transistor, the bypass switch 240 can be implemented with a bipolar junction transistor or other semiconductor switches. The event sensor 230 receives $V_{REG}$ via connection 205 and one or more information signals from the input conditioner 210. In a bypass operational mode, the bypass switch 240 is closed, which provides full battery power to the DC-DC converter 220 and the regulator 250. In an active mode, the bypass switch 240 is opened and the DC-DC converter 220 supplies an input signal to the regulator 250 via connection 225. The DC-DC converter 220 is coupled to an output or LC filter. A ground input of the filter is coupled via connection 221 to the DC-DC converter 220. A switching input is coupled via connection 223 between the DC-DC converter 220 and the intermediate node 224 between the inductor Lo and the capacitor Co. Internal switching rates within the DC-DC converter 220 may be programmable via one or more baseband signals on bus 201. The intermediate node 224 is further coupled to the output of the DC-DC converter 220 and the input of the regulator 250 via connection 225. The controller 200 receives the regulator output via connection 205, which is coupled to an input of the input conditioner 210 and the event sensor 230. The controller 200 receives, and operates in accordance with various baseband signals via bus 201. Example baseband signals are described in relation to the timing diagram in FIG. 4.

Figure 3:
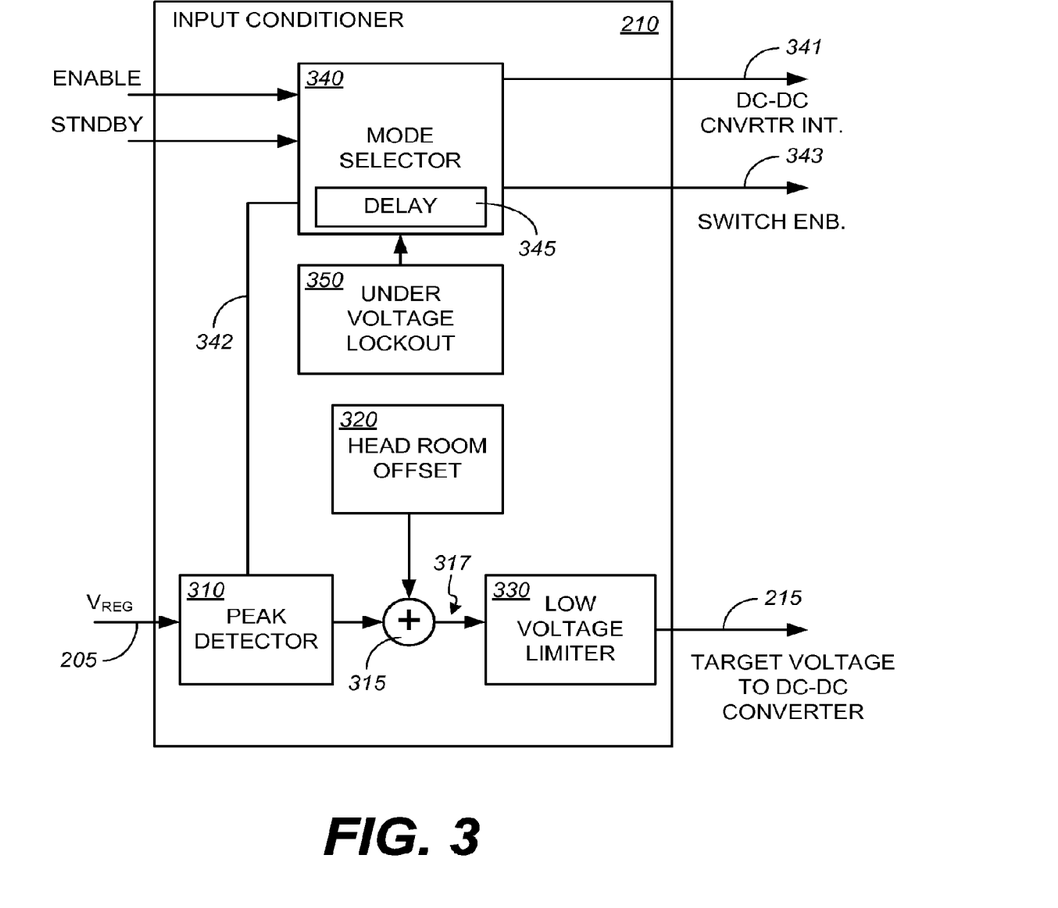
FIG. 3 is a functional block diagram illustrating an embodiment of the input conditioner of FIG. 2.

FIG. 3 is a functional block diagram illustrating an embodiment of the input conditioner 210 of FIG. 2. The input conditioner 210 includes an operational path and a mode select path. The operational path processes the signal received from the output of the regulator on connection 205 and generates a target voltage for the DC-DC converter 220 on connection 215. The operational path includes a peak detector 310, a head room offset element 320 and a low-voltage limiter 330, which act together to set the target voltage. The peak detector 310 sends a signal indicative of the highest detected peak or an average value of $V_{REG}$ and forwards the same to node 315 where a head room offset is added. The result of the combination of the peak value and the head room offset generates an intermediate result, which is forwarded to the low-voltage limiter 330 via connection 317. As long as the intermediate result does not fall below the low limit of the input of the regulator 250 that keeps the power amplifier 160 operating within nominal power levels, the intermediate result is forwarded to the DC-DC converter 220 as the target voltage. Otherwise, when the intermediate result would place the target voltage below the minimum required input voltage at the regulator 250, the low voltage limiter 330 forwards a value that directs the DC-DC converter 220 to transition its output voltage to a level that will keep the power amplifier 160 operating within the power levels required by the present communication standard.

The mode select path includes a mode selector 340 and an under voltage lockout element 350. The mode selector 340 operates in accordance with an enable input, a standby input and the under voltage lockout element 350. As will be explained in detail in association with the timing diagram in FIG. 4, the enable input may be a baseband control signal such as TR_SW and the standby input may be a second baseband control signal PA_EN. In accordance with PA_EN (on the standby input) the mode selector 340 forwards a DC-DC converter initialization signal via connection 341 to internal power control elements within the DC-DC converter 220. The initialization signal directs the DC-DC converter 220 to power up its internal references. After a delay, for example, when TR_SW transitions (on the enable input), the mode selector 340 forwards an enable signal for the peak detector 310 via connection 342. The enable signal directs the peak detector 310 to start monitoring the output of the regulator 250 for peaks. The enable signal further triggers a delay element 345. The delay element may generate a fixed delay or may be programmable to set a range of delay intervals. After the time indicated by the delay element 345 has expired, the mode selector 340 forwards a control signal via connection 343 that directs the DC-DC converter 220 to enter switching mode. During switching mode, the output voltage of the DC-DC converter will ramp down from the battery voltage to the target voltage. The under voltage lockout 350 disables the mode selector 340 and ultimately the DC-DC converter 220 when operating conditions in the output stage of the power amplifier indicate that it would be inefficient or impractical to continue to control the regulator 250 with the DC-DC converter 220.

In order to maximize the efficiency and performance of the transmitter 150 while minimizing control complexity, the power amplifier controller 200 uses the DC-DC converter 220 to control the input to the regulator 250. The DC-DC converter 220 is arranged between the battery and the regulator 250. The DC-DC converter 220 is in a bypass mode (i.e., the controller supply is shorted to the battery) between transmission bursts. The DC-DC converter 220 is controlled by the output of the regulator 250 via the signal on connection 205. More specifically, a peak detector in an input conditioner 210 senses the peak output voltage of the regulator 250 and adds a head room offset to enable the regulator 250 to operate linearly. The DC-DC converter 220 is commanded to a bypass mode between transmission bursts and individual transmission slots of a multiple slot transmission. While in bypass mode, the output of the DC-DC converter 220 and the supply of the regulator 250 are coupled to the battery via connection 225. Consequently, the regulator 250 is fully supplied and ready to handle AM envelope information immediately.

When a transmission burst starts, the DC-DC converter 220 is provided a "standby" signal to power up its internal references. The "standby" signal is followed by an enable signal for the DC-DC converter 220. In response to the enable signal, the input conditioner 210 of the controller 200 starts monitoring the output of the regulator 250 for peaks. After an initial peak acquisition period, the DC-DC converter 220 is commanded by the input conditioner 210 to drop out of bypass mode and enter switching mode. During operation in the switching mode, the DC-DC converter 220 will drop the battery voltage to a target value or $V_{BUCK}$ that includes a function of the detected peak voltages or a maximum peak voltage as adjusted by the headroom offset. The DC-DC converter 220 will remain at the target voltage until the end of the transmission burst.

A bypass switch 240 works in conjunction with an event sensor 230 during active mode. The controller 200 commands the DC-DC converter 220 to a bypass mode and shuts down the DC-DC converter 220 when operation of the DC-DC converter 220 is deemed inefficient or when the DC-DC converter 220 cannot supply the proper voltage to the regulator 250, such as can occur when the handset is operating under poor voltage standing wave ratio (VSWR) conditions.

The controller 200 and DC-DC converter 220 track the AM envelope at the input to the regulator 250 rather than at the RF input to the power amplifier 160. With this arrangement, transmission bursts are supported on a burst-by-burst basis, independent of either single or multi-slot transmission scenarios. That is, the DC-DC converter 220 and the controller 200 handle each burst autonomously without apriori knowledge of each burst and without requiring information from a previous or a following transmission burst.

Figure 4:
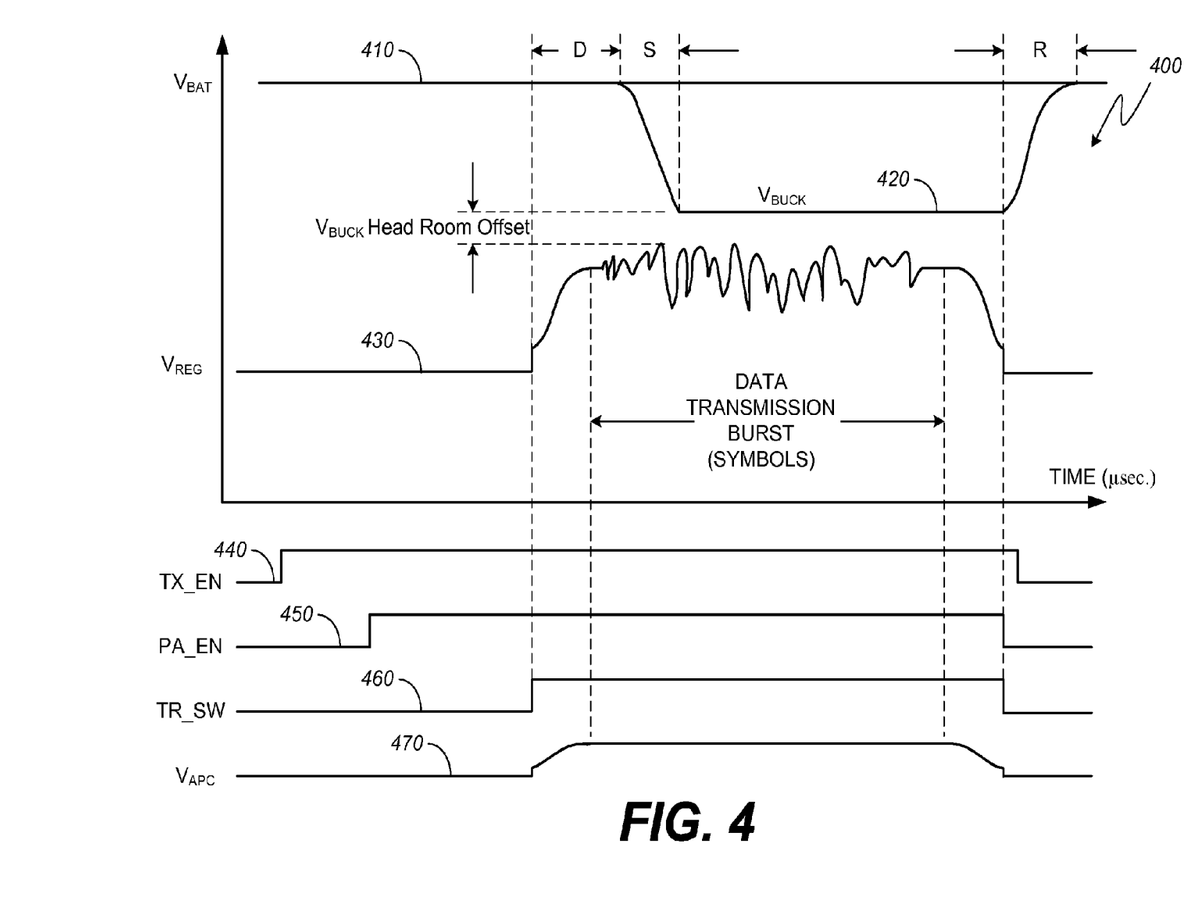
FIG. 4 is a graphical representation of the operation of the controller and method for using a DC-DC converter in a mobile handset.

FIG. 4 is a graphical representation of the operation of the controller 200 and method for using a DC-DC converter in a mobile handset. Plot 400 depicts time along a horizontal axis and electrical potential in volts along the vertical axis. A set of example timing signals are shown below the plot. Trace 440 represents a transmit enable signal labeled TX_EN. The TX_EN signal defines a period of time that starts before a burst transmission and extends until after the data transmission has ended. Trace 450 represents a power amplifier enable signal labeled PA_EN. The PA_EN signal defines a period of time during which the power amplifier is enabled or on. Trace 460 represents a data enable signal labeled TR_SW. The TR_SW signal defines a data transmission period during which data symbols will be communicated from the handset. Trace 470 represents a power amplifier control signal labeled $V_{APC}$. The $V_{APC}$ signal defines a period of time during which the power amplifier is receiving a power control signal. The various delays between the time when TX_EN transitions, the time when PA_EN transitions and the time when TR_SW transitions provide windows for configuring AM and PM loops and power amplifier gain.

Trace 410 represents the output voltage from a battery or other supply in the handset. Trace 410 shows that the battery voltage remains constant during a period of time that starts from before the start of a data transmission burst and ends after the transmission burst has completed and the power amplifier has been disabled. Trace 430 represents the output voltage of the regulator or $V_{REG}$ over time. In accordance with the TR_EN signal transition, $V_{REG}$ shifts in accordance with an offset minimum voltage and ramps up along with $V_{APC}$ to a level around which $V_{REG}$ varies in time during the duration of the data transmission burst. After the data transmission burst is complete, $V_{REG}$ ramps down along with $V_{APC}$ back to the minimum offset value before shifting back to ground. While these signals ramp down to ground, the bypass switch 240 is closed allowing $V_{BUCK}$ to transition back to $V_{BAT}$ during a time labeled R.

As described above, the DC-DC converter 220 is in a bypass mode until TR_SW is enabled. Thereafter, the DC-DC converter 220 is initialized and configured to track peaks in $V_{REG}$. After an adjustable delay labeled D, the DC-DC converter 220 is commanded to a voltage level $V_{BUCK}$ which is below $V_{BAT}$. Accordingly, the trace 420 ramps down during a settling time labeled S from $V_{BAT}$ to $V_{BUCK}$. The voltage level $V_{BUCK}$ is higher than the highest peak detected or an average of the peaks detected during the adjustable delay period D. As indicated in FIG. 4, the difference between a peak in the trace 430 detected during the delay period D and the settling time S and the minimum level of trace 420 is in accordance with the $V_{BUCK}$ head room offset.

Figure 5:
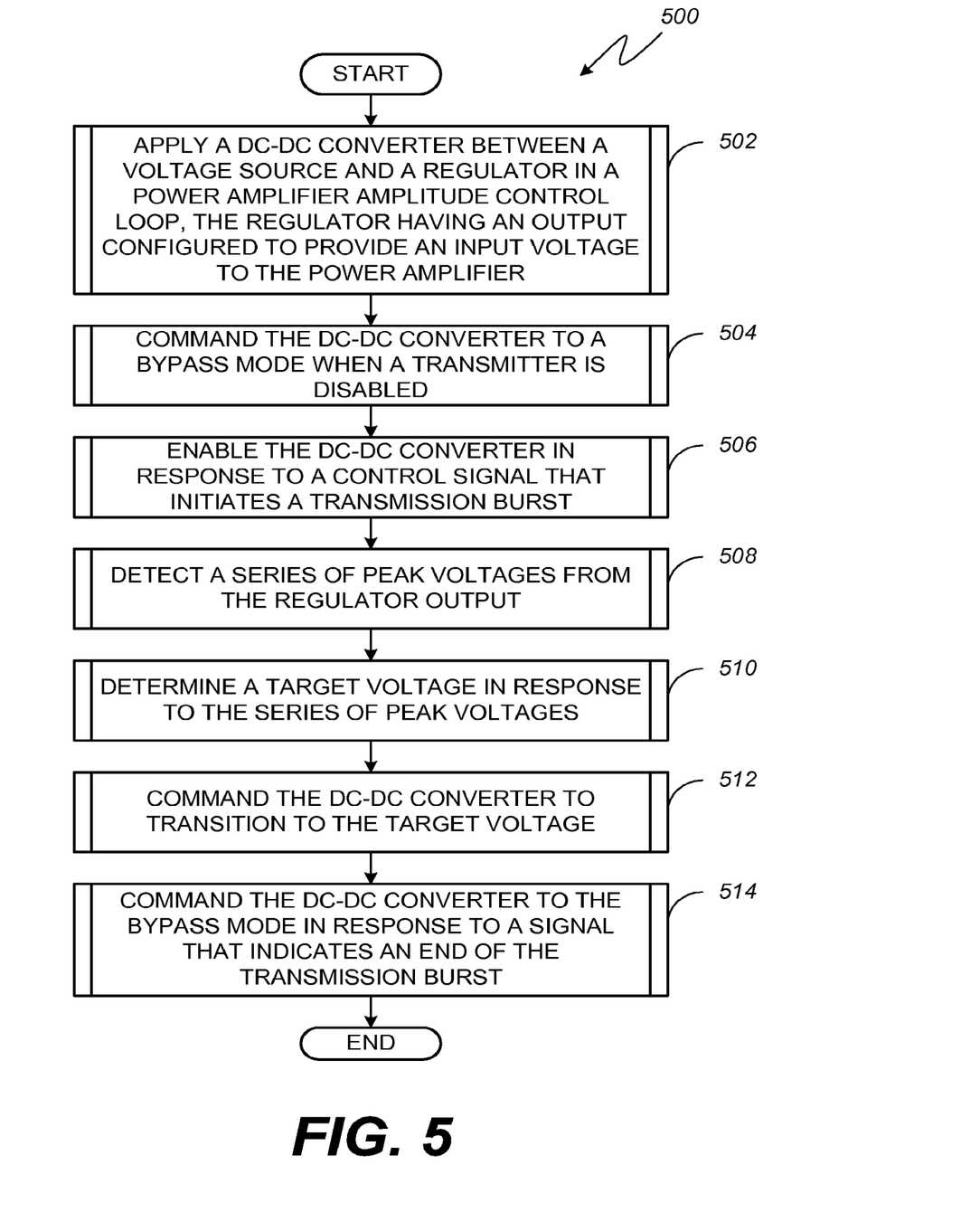
FIG. 5 is a flow chart illustrating the operation of an embodiment of a method for using a DC-DC converter in a mobile handset.

FIG. 5 is a flow chart illustrating the operation of an embodiment of a method for using a DC-DC converter in a mobile handset. The flow diagram of FIG. 5 shows the architecture, functionality, and operation of a possible implementation via software and or firmware associated with a controller arranged with a DC-DC converter that tracks a regulator control signal. In this regard, each block represents a module, segment, or portion of code, which comprises one or more executable instructions for implementing the specified function(s). When the controller 200 is implemented via hardware, hardware and firmware or a combination of hardware and software, one or more blocks in the flow diagram may represent a circuit or circuits. Alternatively, the described functions can be embodied in source code including human-readable statements written in a programming language or machine code that comprises instructions recognizable by a suitable execution system such as a processor in a computer system. The machine code may be converted from the source code, etc.

Method 500 begins with block 502 where a DC-DC converter is integrated between a voltage source and a regulator in a power amplifier amplitude control loop. As further indicated in block 502, the regulator includes an output that is configured to provide an input voltage to the power amplifier. As shown in block 504, the DC-DC converter is placed in a bypass mode when a transmitter is disabled. In block 506, the DC-DC converter is enabled in response to a control signal that initiates a transmission burst from the mobile handset.

Thereafter, as illustrated in block 508, a series of peak voltages (i.e., localized maximum values) of the regulator output are detected. Next, as shown in block 510, a target voltage is determined from the series of peak voltages. Next, as shown in block 512, the DC-DC converter is commanded to transition to the target voltage. The DC-DC converter remains at the more efficient target voltage until, as indicated in block 514, the DC-DC converter is commanded to the bypass mode in response to a signal that indicates the end of the transmission burst.

As described above, the input conditioner of the controller can be designed or otherwise programmed to wait for a desired time for the peak detector to settle. In addition, the input conditioner can instruct the peak detector to track the regulator output voltage throughout the remaining portion of the transmission burst.

Accordingly, in an alternative embodiment, an event sensor can be configured to detect when a magnitude of a peak in the regulator output exceeds the target voltage. The event sensor is coupled to a switch that bypasses the DC-DC converter and couples an input of the regulator to the battery. As soon as the output of the regulator, as detected by the peak detector in the input conditioner, falls below the target voltage, the event sensor can couple the DC-DC converter to the battery. The event sensor can be further configured to respond to other indicators that the DC-DC converter is operating inefficiently or can no longer provide the proper voltage to the regulator. This may be the case when the handset is operating under poor voltage standing wave ratio (VSWR) conditions.

While various embodiments of the controller and method for using a DC-DC converter in a mobile handset have been described, it will be apparent to those of ordinary skill in the art that many more embodiments and implementations are possible that are within the scope of this disclosure. Accordingly, the controller and method are not to be restricted except in light of the attached claims and their equivalents.

What is claimed is:

1. A method for using a DC-DC converter in a mobile handset, the method comprising:
    applying a DC-DC converter between a voltage source and a regulator, the regulator having an output connected to a power amplifier;
    enabling the DC-DC converter in response to a transmission burst;
    detecting a plurality of peaks from the regulator output;
    determining a target voltage in response to the plurality of peaks;
    commanding the DC-DC converter to transition to the target voltage; and
    commanding the DC-DC converter to a bypass mode in response an end of the transmission burst.

2. The method of claim 1 wherein commanding the DC-DC converter to the bypass mode includes coupling the DC-DC converter to a battery, the battery providing a battery voltage.

3. The method of claim 2 wherein determining the target voltage further includes limiting the voltage gap between the battery voltage and the target voltage.

4. The method of claim 1 wherein enabling the DC-DC converter includes responding to a transmitter switch signal.

5. The method of claim 1 wherein detecting the plurality of peaks from the regulator output includes coupling the output of the regulator to a peak detector.

6. The method of claim 5 further comprising waiting a desired time for the peak detector to settle.

7. The method of claim 6 wherein waiting a desired time includes using an adjustable delay element.

8. The method of claim 6 wherein waiting a desired time includes waiting for a predetermined time.

9. The method of claim 1 wherein determining the target voltage includes determining a target voltage that is higher than a function of the plurality of peaks.

10. The method of claim 9 further comprising commanding the DC-DC converter to the bypass mode when a magnitude of a peak in the regulator output exceeds the target voltage.

11. The method of claim 1 wherein commanding the DC-DC converter to the bypass mode includes commanding the DC-DC converter in response to a pedestal voltage.

12. The method of claim 11 wherein the pedestal voltage is associated with a regulator input signal.

13. The method of claim 1 further comprising using the steps of commanding the DC-DC converter in a bypass mode, enabling, detecting, determining and commanding the DC-DC converter to transition to the target voltage to communicate a multi-slot transmission burst with amplitude modulation.

14. The method of claim 1 further comprising commanding the DC-DC converted in the bypass mode when a transmitter is not enabled.

15. A power amplifier controller, comprising:
an input conditioner connected to a regulator and a DC-DC converter, the input conditioner including a peak detector responsive to an output of the regulator and a mode selector responsive to input signals from a baseband subsystem; and
an event sensor configured to direct coupling between a voltage source and the DC-DC converter in response to a bypass event.

16. The controller of claim 15 wherein the input conditioner further includes an offset for determining a target voltage that is higher than a function of a series of peak voltages detected by the peak detector.

17. The system of claim 16 wherein the bypass event includes a peak voltage that exceeds the target voltage.

18. The system of claim 16 wherein the bypass event includes a signal condition indicative of an end of a transmission burst.

19. The controller of claim 15 wherein the input conditioner further includes a low-voltage limiter configured to limit the voltage gap between the battery voltage and a target voltage.

20. The controller of claim 15 further comprising a switching node for controlling the frequency of the output from the DC-DC converter.

21. The controller of claim 15 wherein the mode selector is responsive to an under voltage lockout detector.

22. A wireless device, comprising:
a transmitter circuit;
a receiver circuit;
an antenna configured to transmit signals from the transmitter circuit and to receive signals for the receiver circuit;
a power amplifier configured to amplify at least some of the signals, the power amplifier being powered via a DC-DC converter and a regulator; and
a power amplifier controller having an input conditioner and an event sensor, the input conditioner connected to the regulator and the DC-DC converter and including a peak detector responsive to an output of the regulator and a mode selector responsive to input signals from a baseband subsystem, the event sensor configured to direct coupling between a voltage source and the DC-DC converter in response to a bypass event.

\* \* \* \* \*

UNITED STATES PATENT AND TRADEMARK OFFICE
CERTIFICATE OF CORRECTION

| | | |
|---|---|---|
| PATENT NO. | : 8,639,200 B2 | Page 1 of 1 |
| APPLICATION NO. | : 13/230070 | |
| DATED | : January 28, 2014 | |
| INVENTOR(S) | : Elias Dagher | |

It is certified that error appears in the above-identified patent and that said Letters Patent is hereby corrected as shown below:

In the Claims

In column 10 at line 52, In Claim 1, after "response" insert --to--, therefor.

Signed and Sealed this
Thirtieth Day of December, 2014

Michelle K. Lee
*Deputy Director of the United States Patent and Trademark Office*